US008953855B2

(12) United States Patent
Namai et al.

(10) Patent No.: US 8,953,855 B2
(45) Date of Patent: Feb. 10, 2015

(54) EDGE DETECTION TECHNIQUE AND CHARGED PARTICLE RADIATION EQUIPMENT

(75) Inventors: Hitoshi Namai, Hitachinaka (JP);
Osamu Komuro, Hitachinaka (JP);
Satoru Yamaguchi, Hitachinaka (JP);
Fumihiro Sasajima, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 962 days.

(21) Appl. No.: 12/393,321

(22) Filed: Feb. 26, 2009

(65) Prior Publication Data

US 2009/0226096 A1 Sep. 10, 2009

(30) Foreign Application Priority Data

Mar. 5, 2008 (JP) ................................. 2008-054226

(51) Int. Cl.
*G06K 9/00* (2006.01)
*G06K 9/46* (2006.01)
*G06T 7/00* (2006.01)

(52) U.S. Cl.
CPC ............ *G06K 9/4609* (2013.01); *G06T 7/0085* (2013.01)
USPC .......................................... 382/128; 382/199

(58) Field of Classification Search
USPC .......... 382/128–132, 141–151, 199, 270, 266
See application file for complete search history.

(56) References Cited

U.S. PATENT DOCUMENTS

| 6,434,279 | B1 * | 8/2002 | Shiba ............................. 382/294 |
| 6,714,679 | B1 * | 3/2004 | Scola et al. ................... 382/199 |
| 7,026,615 | B2 | 4/2006 | Takane et al. |
| 7,426,319 | B2 * | 9/2008 | Takahashi ...................... 382/294 |
| 8,009,892 | B2 * | 8/2011 | Ohara et al. ................... 382/132 |
| 8,712,164 | B2 * | 4/2014 | Shimada et al. .............. 382/199 |
| 2003/0048938 | A1 * | 3/2003 | Wang et al. ................... 382/132 |
| 2006/0153447 | A1 * | 7/2006 | Ouchi ............................ 382/173 |
| 2007/0187595 | A1 | 8/2007 | Tanaka et al. |

FOREIGN PATENT DOCUMENTS

| JP | 2002-328015 | 11/2002 |
| JP | 2007-218711 | 8/2007 |

* cited by examiner

*Primary Examiner* — Brian Le
(74) *Attorney, Agent, or Firm* — McDermott Will & Emery LLP

(57) ABSTRACT

An object of the present invention is to provide an edge detection technique and equipment which are capable of stably detecting an edge by suppressing the influence of noise even in the case where the image is obtained by charged particle radiation equipment, such as a scanning electron microscope and has a low S/N ratio. More specifically, the present invention is to propose a technique and equipment which are configured to determine a peak position (edge) on the basis of the following two edge extraction techniques. That is, the present invention is to propose a technique and equipment wherein at least two peaks are formed by using, as edge detection techniques, for example, one peak detection technique having a relatively high sensitivity and the other peak detection technique which is relatively less susceptible to the influence of noise than the one peak detection technique, and wherein a position where the peaks coincide with each other is determined as a true peak position (edge position).

8 Claims, 14 Drawing Sheets

EDGE DETECTION TECHNIQUE AND CHARGED PARTICLE RADIATION EQUIPMENT

BACKGROUND OF THE INVENTION

1. Field of the Invention

The present invention relates to an edge detection technique and charged particle radiation equipment. More particularly, the present invention relates to an edge detection technique and charged particle radiation equipment which are capable of stably detecting an edge irrespective of noise, and the like.

2. Background Art

In recent years, the miniaturization of patterns to be inspected has been accelerated according to a tendency to higher integration of semiconductor devices. According to ITRS (International Technology Roadmap for Semiconductors), the physical gate length in an MPU (Microprocessor Unit) is predicted to be 25 nm for 65 nm node, and is predicted to be 18 nm for 45 nm node.

Under the circumstances where the miniaturization is advanced in this way, an actually generated pattern tends to have larger variations in position, width, linearity, and the like, as compared with the design value.

On the other hand, it has become difficult to improve the image quality by the frame addition because of the problem of image quality deterioration due to electrification and contamination of the sample surface, the problem of radiation damage, the demand for throughput improvement, and the like.

Therefore, it is necessary to detect an ultra-fine line and a line having a small luminance change more robustly against noise as compared with before. In patent document 1, there is described a technique for reducing noise by the composite image formation based on the frame addition. Further, in patent document 2, there is also described that smoothing processing is performed to an image in order to reduce noise.

Patent Document 1: JP Patent Publication (Kokai) No. 2007-218711 (corresponding to US2007/0187595)

Patent Document 2: JP Patent Publication (Kokai) No. 2002-328015 (corresponding to U.S. Pat. No. 7,026,615)

SUMMARY OF THE INVENTION

There are several noise reduction techniques based on the smoothing processing, the addition averaging processing, and the like. However, the techniques perform processing in the state of including noise components. For this reason, the techniques are capable of sufficiently detecting an edge having a large luminance change, but have a problem that in the case of an edge having a small luminance change, it is difficult to discriminate between the edge and noise.

In order to solve the above described problem, an object of the present invention is to provide an edge detection technique and equipment which are capable of stably detecting an edge in an image by suppressing the influence of noise even in the case where the image is obtained by charged particle radiation equipment, such as a scanning electron microscope, and has a low S/N ratio. More specifically, the present invention is to propose a technique and equipment which are configured to determine a peak position (edge) on the basis of the following two edge extraction techniques. That is, the present invention is to propose a technique and equipment which are configured to determine a true peak position (edge position) in such a manner that at least two peak positions are detected by using, as edge detection techniques, for example, one peak detecting technique having a relatively high sensitivity and the other edge detection technique which is less influenced by noise as compared with the one technique, and that a position where the two detected peak positions coincide with each other is determined as the true peak position (edge position).

According to the above described configuration, it is possible to provide a technique and equipment which are capable of stably detecting the edge irrespective of the existence of noise, and the like.

DESCRIPTION OF SYMBOLS

Figure 1:
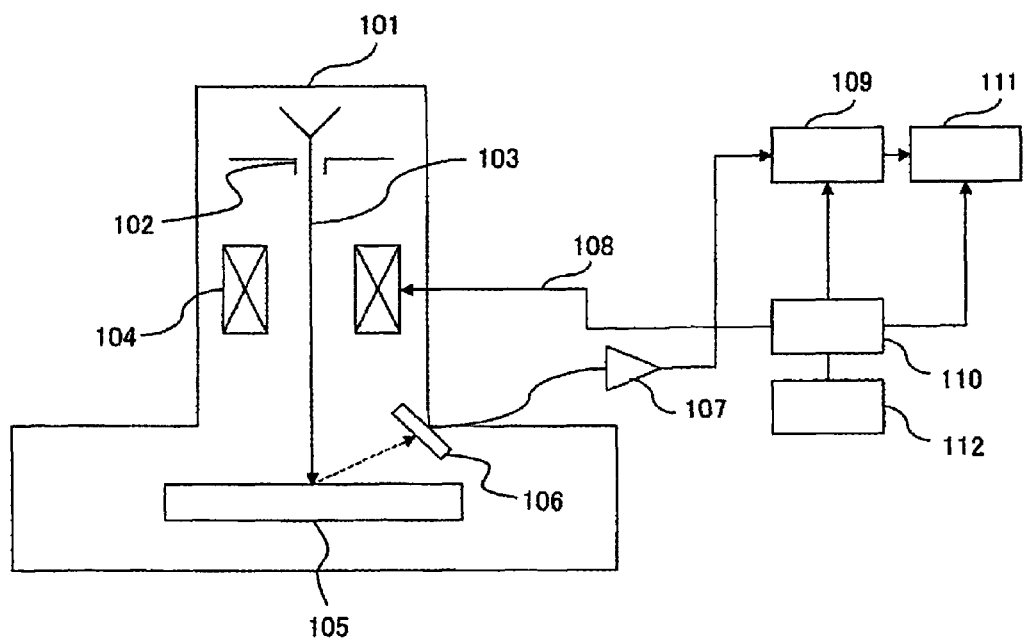
FIG. 1 is a figure showing a configuration example of a scanning electron microscope system.

101 Housing portion of electron microscope
102 Electron beam gun
103 Electron beam
104 Deflector plates
105 Sample
106 Electron detector
107 Amplifier
108 Control signal
109 Image processing processor
110 Control computer
111 Display apparatus
112 Input device

DETAILED DESCRIPTION OF THE PREFERRED EMBODIMENTS

In the following, there will be exemplified a technique which is configured to stably detect, by suppressing the influence of noise, an edge in an image having a low S/N ratio and acquired by using a scanning electron microscope, and the like. As an aspect of the technique, there will be described a technique which is configured to stably detect the edge in such a manner that, in addition to a profile obtained by smoothing processing and addition averaging processing, a profile obtained and created by a noise-robust statistical technique, and that edge candidates of both the profiles are compared with each other. In other words, the technique relates to a technique configured to determine a peak position on the basis of two edge extraction techniques, and is a technique configured to stably perform edge detection by using two techniques, one of which is an edge detection technique which has a high sensitivity but is liable to be influenced by noise, and the other of which is hardly influenced by noise but has a low sensitivity.

First Embodiment

In the description of the following embodiment, there will be described an example in which a differential profile obtained by applying projection processing, smoothing processing, and differential operation processing to an electronic image obtained by scanning an electron beam on a sample is compared with a filter image smoothing profile obtained by applying statistical filter processing, projection processing, and smoothing processing to the image, and in which a portion where peak positions of both the profiles coincide with each other is determined as an edge position. Further, in the statistical filter processing, a nonparametric test is performed in a filter area, and when there is a significant difference in the area, the area is set as an edge candidate.

FIG. 1 shows a configuration example of a scanning electron microscope system. Note that in the following, description will be given by taking the scanning electron microscope as an example, but the present invention is not limited to this. The present invention can also be applied to the other charged particle radiation equipment, such as focused ion beam equipment. Reference numeral 101 denotes a housing portion of an electron microscope, and an electron beam 103 emitted from an electron beam gun 102 is converged by an electron lens (not shown), so as to be irradiated onto a sample 105. The intensity of secondary electrons or reflected electrons, which are generated from the sample surface by the electron beam irradiation, is detected by an electron detector 106, and is amplified by an amplifier 107. Reference numeral 104 denotes a deflector plates for moving the position of the electron beam, and the electron beam 103 is raster-scanned on the sample surface by a control signal 108 of a control computer 110.

A signal outputted from the amplifier 107 is AD (analog-to-digital) converted in an image processing processor 109, so that digital image data are created. Reference numeral 111 denotes a display device which displays the image data. Further, the image processing processor 109 includes an image memory which stores the digital image data, an image processing circuit which performs various kinds of image processing, and a display control circuit which performs display control. Input devices 112, such as a keyboard and a mouse, are connected to the control computer 110. The image processing processor 109 and the control computer 110, as described above, function as an edge detecting section used for edge position extraction as will be described below.

Note that an address signal corresponding to a memory position in the image memory is generated in the control computer 110, so as to be subjected to digital/analogue conversion and is thereafter supplied to the deflector plates 104 via a scanning coil control power source (not shown). For example, in the case where the image memory corresponds to 512×512 pixels, the address signal in the X direction is a digital signal which repeats 0 to 511. On the other hand, the address signal in the Y direction is a digital signal which repeats 0 to 511 and which is incremented by 1 at the time when the address signal in the X direction reaches 511 from 0. These signals are converted into analog signals.

The address in the image memory corresponds to the address of the deflection signal for scanning the electron beam, and hence a two dimensional image in the area in which the electron beam is deflected by the deflector plates 104 is recorded in the image memory. Note that the signal in the image memory can be sequentially read in time series by a read address generating circuit (not shown) which is synchronized with a read clock. The signal read in correspondence with the address is analog-converted to become a luminance modulation signal of the display apparatus 111.

The image memory has a function of superposing (composing) and storing images (image data) to improve the S/N ratio. For example, one complete image is formed by superposing and storing images which are obtained by eight two-dimensional scans. That is, a final image is formed by composing images each of which is formed in one or more X-Y scanning units. The number of images (frame integration number) for forming one complete image can be arbitrarily set, and is set to a suitable value in consideration of secondary electron generation efficiency, and the like. Further, an image desired to be finally acquired can also be formed by further superposing a plurality of images each of which is formed by integrating a plurality of images. At the time when or after the desired number of images are stored, blanking of the primary electron beam may be performed so as to interrupt the input of information into the image memory.

The sample 105 is arranged on a stage (not shown), and can be moved in the two directions (X direction and Y direction) within the surface perpendicular to the electron beam.

The equipment according to the present embodiment has a function of forming a line profile on the basis of detected secondary or reflected electrons. The line profile is formed on the basis of the electron detection amount, the luminance information of the sample image, or the like, at the time when the primary electron beam is one-dimensionally or two-dimensionally scanned. The obtained line profile is used, for example, to measure the dimension of a pattern formed on a semiconductor wafer, and the like.

Note that the explanation of FIG. 1 has been given, assuming that the control computer is integrated with the scanning electron microscope, or assuming an equivalent configuration, but the present invention is not obviously limited to this. The processing as will be described below may be performed by a control processor which is provided separately from the scanning electron microscope main body. In that case, there are needed a transmission medium for transmitting to the control processor a detection signal detected by the electron detector 106, and for transmitting a signal from the control processor to the lens, the deflector plates, and the like, of the scanning electron microscope, and an input/output terminal for inputting and outputting the signal transmitted via the transmission medium.

Further, it may also be configured such that a program configured to perform the processing as will be described below is registered in a storage medium, and that the program is executed by a control processor which has an image memory and which supplies a signal required by the scanning electron microscope.

Figure 2:
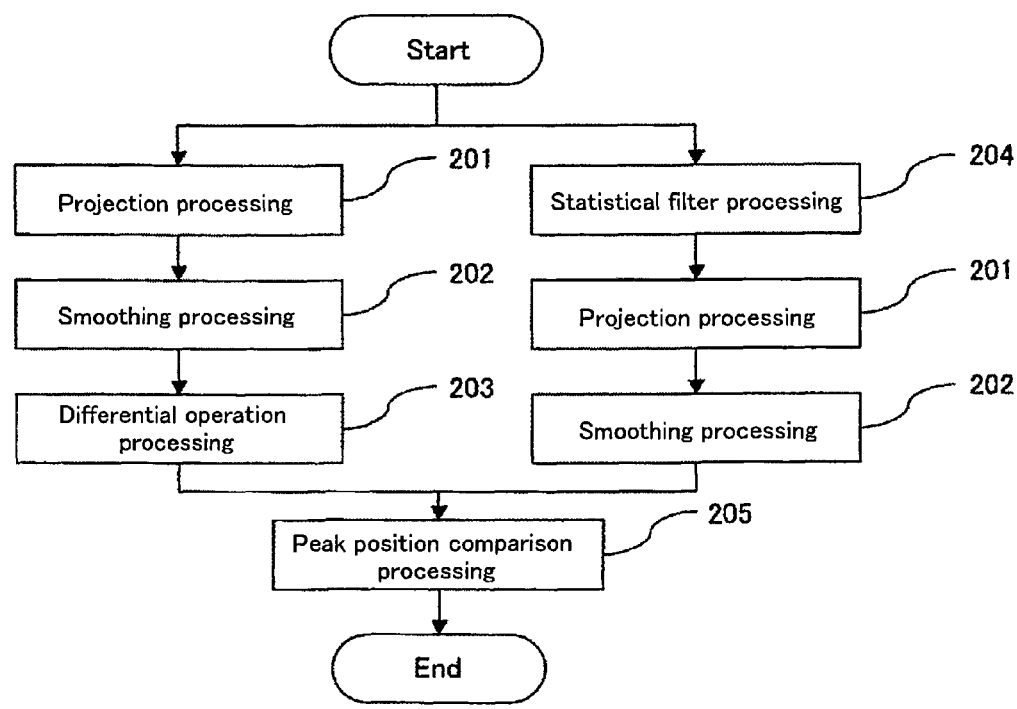
FIG. 2 is a figure for explaining an outline of edge extraction processing.

FIG. 2 shows an outline of edge extraction processing according to the present invention.

Edge candidates are obtained by two kinds of techniques from an electron microscope image captured by the electron microscope.

First, there will be described a technique for obtaining a first candidate.

Figure 3:
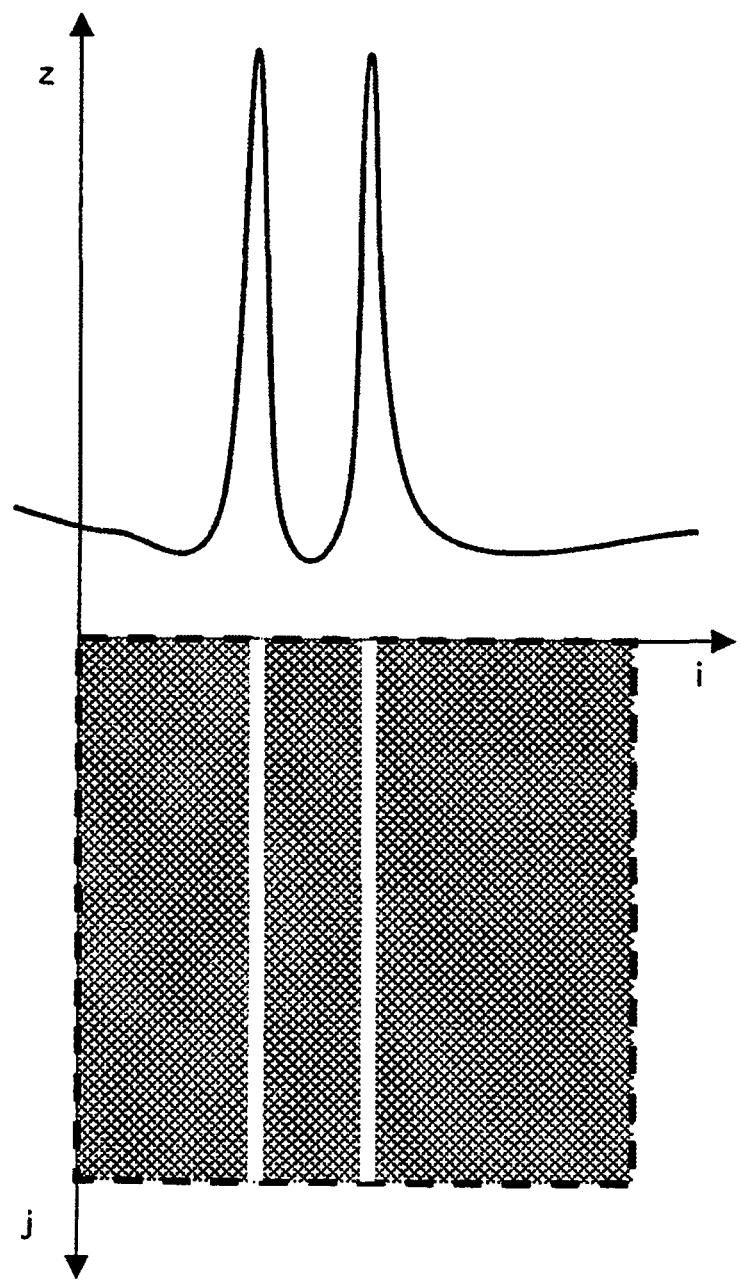
FIG. 3 is a figure showing an outline of projection processing.

First, pixel values of the image are projected on an axis (here i axis) perpendicular to a line by projection processing 201, as shown in FIG. 3, and an addition average is taken in the line segment direction so as to improve the S/N ratio. When the size of the image is set by coordinate values (M, N), the projection processing can be expressed by formula 1. Here, I (i, j) represents pixel values at image coordinates (i, j).

$$z(i) = \sum_{j=0}^{N-1} I(i, j)/N \quad \text{(Formula 1)}$$

Further, the smoothing processing using a moving average as shown by formula 2 is performed in smoothing processing 202, so as to thereby improve the S/N ratio.

$$s(i) = \frac{1}{L} \sum_{k=-\frac{L-1}{2}}^{\frac{L-1}{2}} z(i+k) \quad \text{(Formula 2)}$$

Finally, as shown in formula 3, an edge candidate is obtained by calculating a change in the signal by differential operation processing 203.

$$d(i) = s\left(i + \frac{D-1}{2}\right) - s\left(i - \frac{D-1}{2}\right) \quad \text{(Formula 3)}$$

There will be described a method for obtaining the other edge candidate.

In statistical filter processing 204, a predetermined chip area is segmented from the image, and statistical processing (test) is performed to the segmented area. Here, a nonparametric test is performed. The nonparametric test is a statistical technique which is based on the knowledge that various order statistics follow a known distribution under a null hypothesis and which needs neither noise distribution nor a population parameter. Here, the edge candidate is obtained by a code check based on Wilcoxon's rank sum test.

Figure 4:
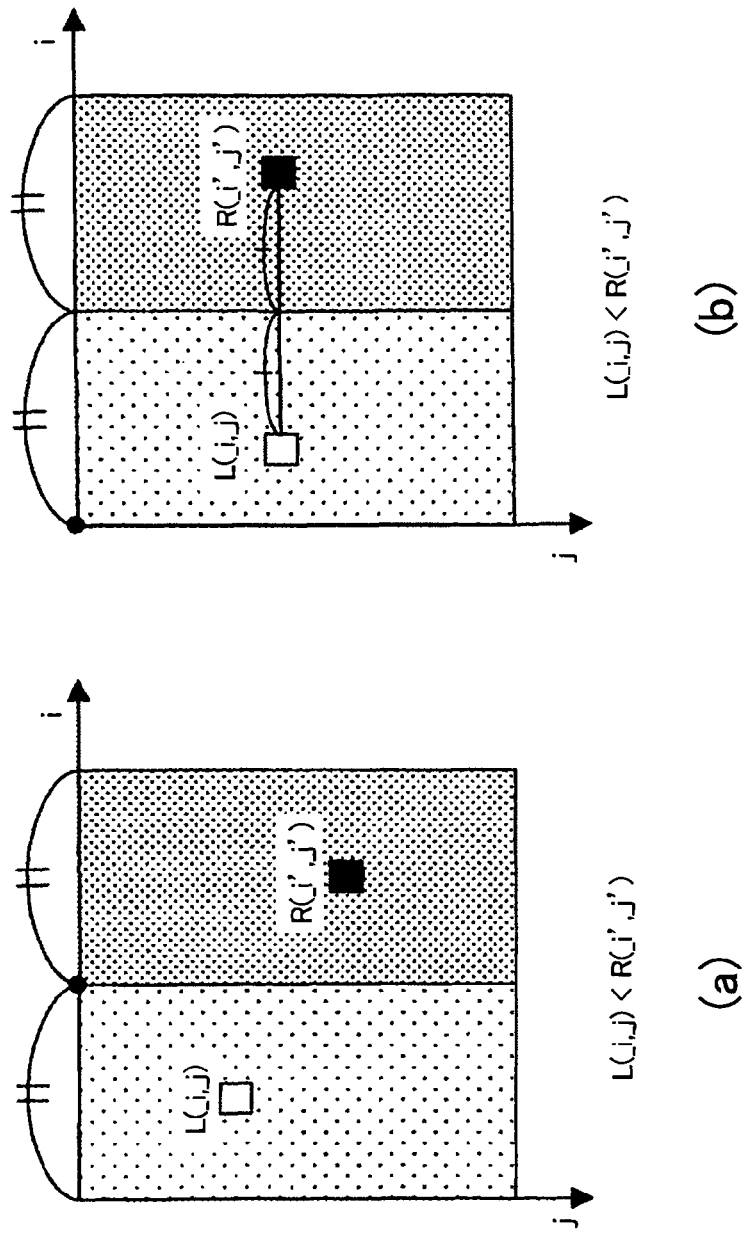
FIG. 4 is a figure showing an example of a sample extraction technique based on a nonparametric test.

In FIG. 4, when attention is directed to two small areas in a chip, a code sum n=# {R(i, j)<L (i, j)} follows a known normal distribution under the null hypothesis (the assumption that there is no edge=the left and right luminance values are substantially the same).

Therefore, an edge degree E(i, j) at (i, j) can be obtained by formula 4.

$$E(i, j) = \frac{\#\{L(i, j) < R(i, j)\} - \#\{i, j\}/2}{\#\{i, j\}^{1/2}/2} \quad \text{(Formula 4)}$$

L(i, j): a pixel value extracted from the left area in the chip
R(i, j): a pixel value extracted from the right area in the chip
{i, j}: the number of portions extracted from the left and right areas in the chip
{L(i, j)<R (i, j)}: the number of portions in the chip at which portions the pixel value extracted from the right area is larger than the pixel value extracted from the left area Here, when the pixel values are extracted from the left and right areas, the pixel values are not randomly extracted as shown in FIG. 4A, but are extracted, for example, line-symmetrically with respect to the boundary as shown in FIG. 4B. Thereby, it is possible to obtain a same effect as calculating differentials for various widths. Here, the line-symmetrical technique as shown in FIG. 4B is used.

The projection processing 201 and the smoothing processing 202 are performed to the edge degree E(i, j), so as to improve the S/N ratio similarly to the technique by which the first edge candidate is obtained.

Note that as for the peak determination, it may also be configured such that a predetermined threshold value is set in the height direction of the peak, and that a position having a value exceeding the threshold value is determined as the peak position, so that the above described processing is performed.

In the following, among the two profiles obtained in this way, the profile obtained by the first technique will be referred to as an original image differential profile, and the profile obtained by the second technique will be referred to as a filter image smoothing profile.

In the original image differential profile, all the pixel values are added. Thus, the original image differential profile is largely influenced by noise. On the other hand, in the filter image smoothing profile, the edge degree is obtained only from the magnitude relation between the pixel values without using the pixel values themselves. Thus, the filter image smoothing profile is highly resistive to noise. However, the edge degree is a test statistic, and hence has very low sensitivity.

Figure 5:
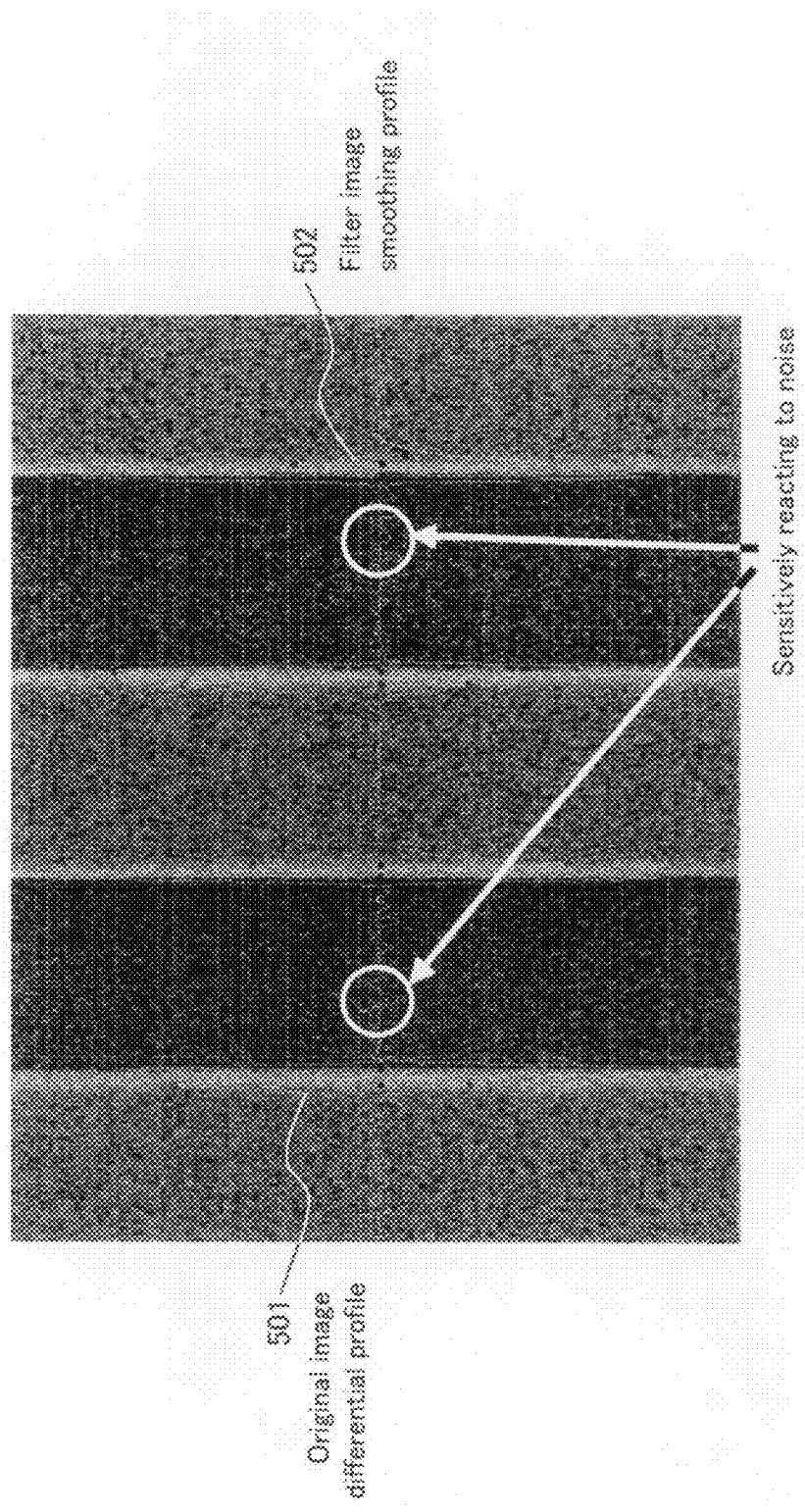
FIG. 5 is a figure for explaining examples of an original image differential profile and a filter image smoothing profile.

FIG. 5 shows the two profiles.

Reference numeral 501 denotes an original image differential profile, and reference numeral 502 denotes a filter image smoothing profile. In order to intelligibly display the two profiles, they are displayed by being superposed with the original image and by inverting the sign of the one profile (the filter image smoothing profile 502).

It is seen from the figure that the original image differential profile 501 has higher sensitivity and sensitively reacts to noise. On the other hand, it is seen that the filter image smoothing profile 502 has low sensitivity and has resistance to noise.

Thus, in peak position comparison processing 205, peaks of the two profiles are compared with each other, and a position where the peak positions of the two profiles coincide with each other is set as an edge position. However, the peak position is slightly shifted due to an inclination, roughness, and the like, of the line, and hence is provided with a likelihood of several pixels.

In particular, when the line is inclined, the image is divided beforehand into a plurality of areas, and edges are extracted for each of the areas. When extracted edges between the respective divided areas have edge positions and peak vales which are close to each other, the extracted edges are set as an edge to be obtained. The divided area is hereinafter referred to as a layer.

Each peak position is obtained by formula 5, and the peak value is obtained by formula 6.

$$Pos = \frac{Pos_O + Pos_F}{2} \quad \text{(Formula 5)}$$

$Pos_O$: the peak position of an original image differential profile
$Pos_F$: the peak position of a filter image smoothing profile $$Peak = Peak_O + Peak_F \quad \text{(Formula 6)}$$

$Peak_O$: a peak value of an original image differential profile
$Peak_F$: a peak value of a filter image smoothing profile For example, a portion where the highest evaluation value is obtained by the formula 7 is set as an edge.

$$\mathrm{Eval}_{Edge} = \alpha \times \mathrm{Eval}_{Pos} + (1-\alpha) \times \mathrm{Eval}_{Peak} \quad \text{(Formula 7)}$$

α: weight (0≤α≤1)

$$\mathrm{Eval}_{Pos} = 1 - \frac{|Pos_n - Pos_{n+1}|}{\lambda_{Pos}}$$

However, $\lambda_{Pos} < |Pos_0 - Pos_{n+1}| \Rightarrow \mathrm{Eval}_{Pos} = 0$
$Pos_n$: the edge position of the n-th layer
$Pos_{n+1}$: the edge position of the (n+1)st layer
$\lambda_{Pos}$: a likelihood of edge position $$\mathrm{Eval}_{Peak} = 1 - \frac{|Peak_n - Peak_{n+1}|}{\lambda_{Peak}}$$

Figure 6:
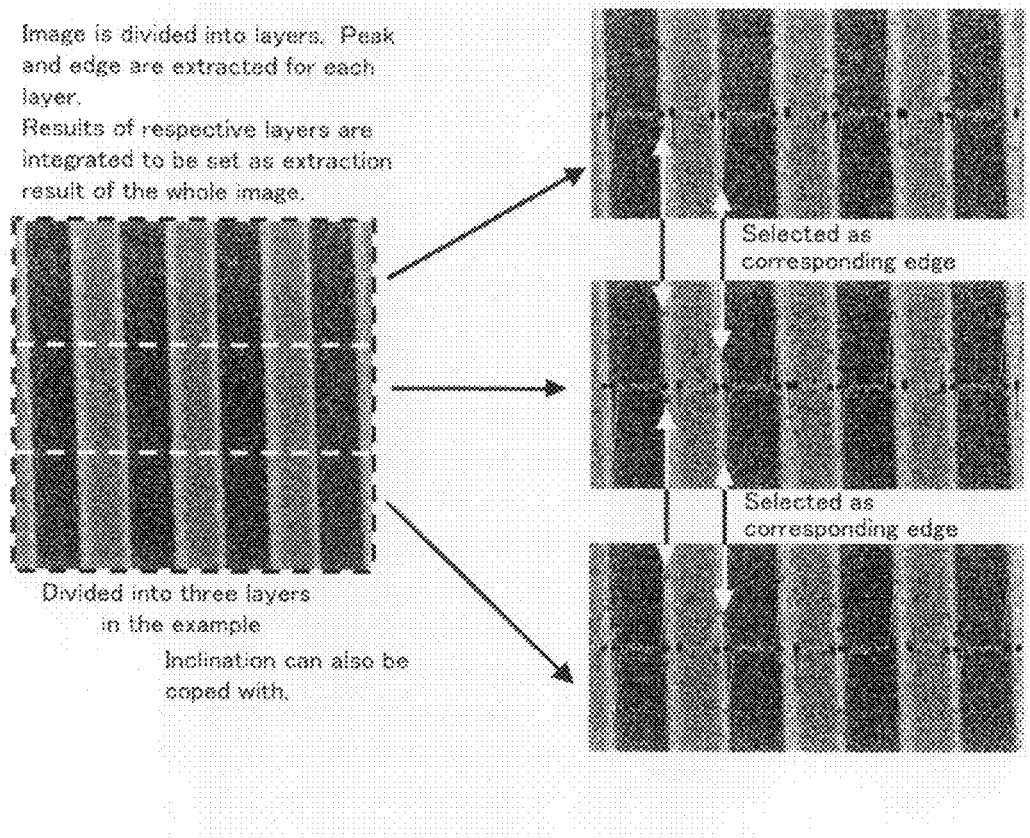
FIG. 6 is a figure for explaining an outline of edge extraction (at a time of area division).

However, $\lambda_{Peak} < |Peak_n - Peak_{n+1}| \Rightarrow \mathrm{Eval}_{Peak} = 0$
$Peak_n$: a peak value of the n-th layer
$Peak_{n+1}$: a peak value of the (n+1)st layer
$\lambda_{Peak}$: a likelihood of peak value FIG. 6 shows an outline of edge extraction in the case where the image is divided into a plurality of areas. When the image is divided into the respective layers, it is possible to reduce variations in the edge position and the peak value due to the inclination, so that it is possible to robustly extract the edge. Note that the above description relates to the example in which the two edge detection techniques are used, but three or more edge detection techniques may also be used as required.

Second Embodiment

There will be described a line matching technique using the edge extraction technique according to the present invention.

In the case where a line width of a precise pattern drawn on a wafer is measured at the time of manufacturing a semiconductor device, electron microscope equipment is used. Here, when the line width of the precise pattern drawn on the wafer is measured, there is used the scanning electron microscope system as described above.

Figure 7:
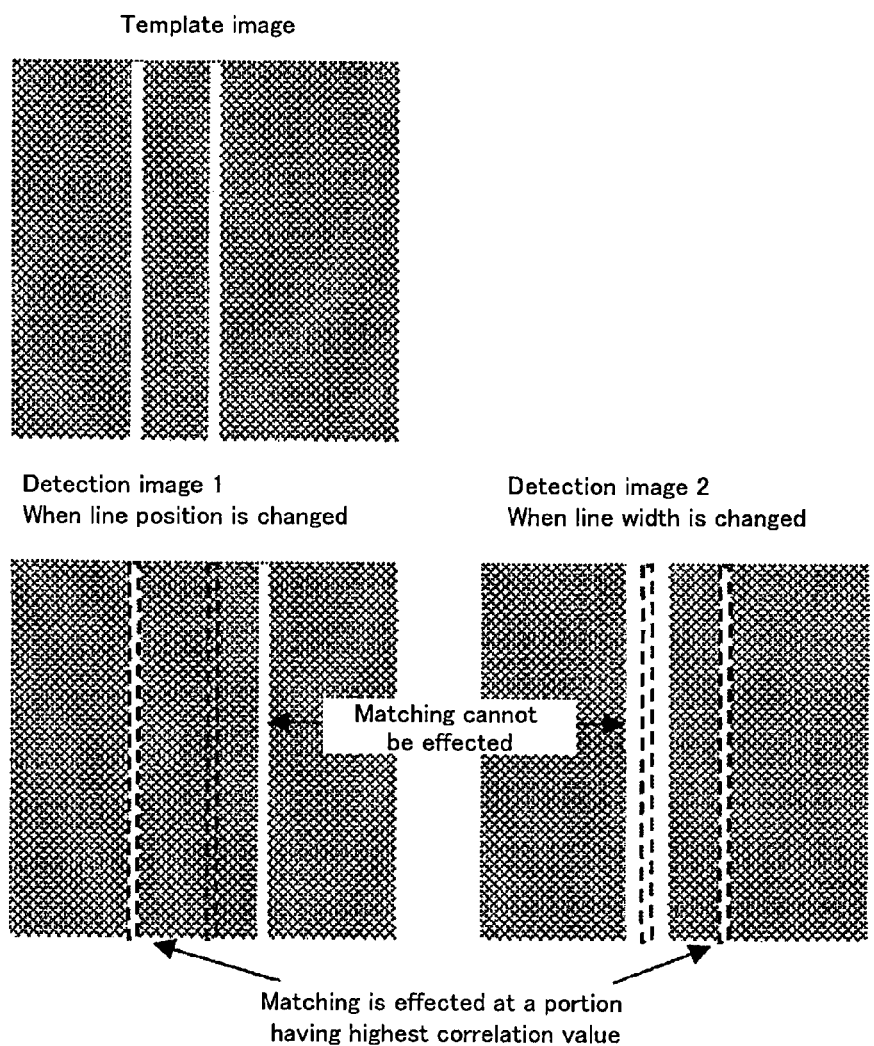
FIG. 7 is a figure for explaining a problem of a normalized correlation technique.

At this time, a normalized correlation technique is mainly used at present as the technique to find a portion where the line width of the wafer is measured. However, it is not possible by the normalized correlation technique to precisely effect matching in the case of a pattern in which the position and the width of a line are varied (see FIG. 7).

Thus, the position of a line edge is roughly determined by the conventional normalized correlation technique, and thereafter a line edge is extracted by the edge extraction technique according to the present invention. Then, alignment is accurately performed by effecting matching between the extracted line edges, so that a portion to be subjected to the length measurement can be robustly specified.

Figure 8:
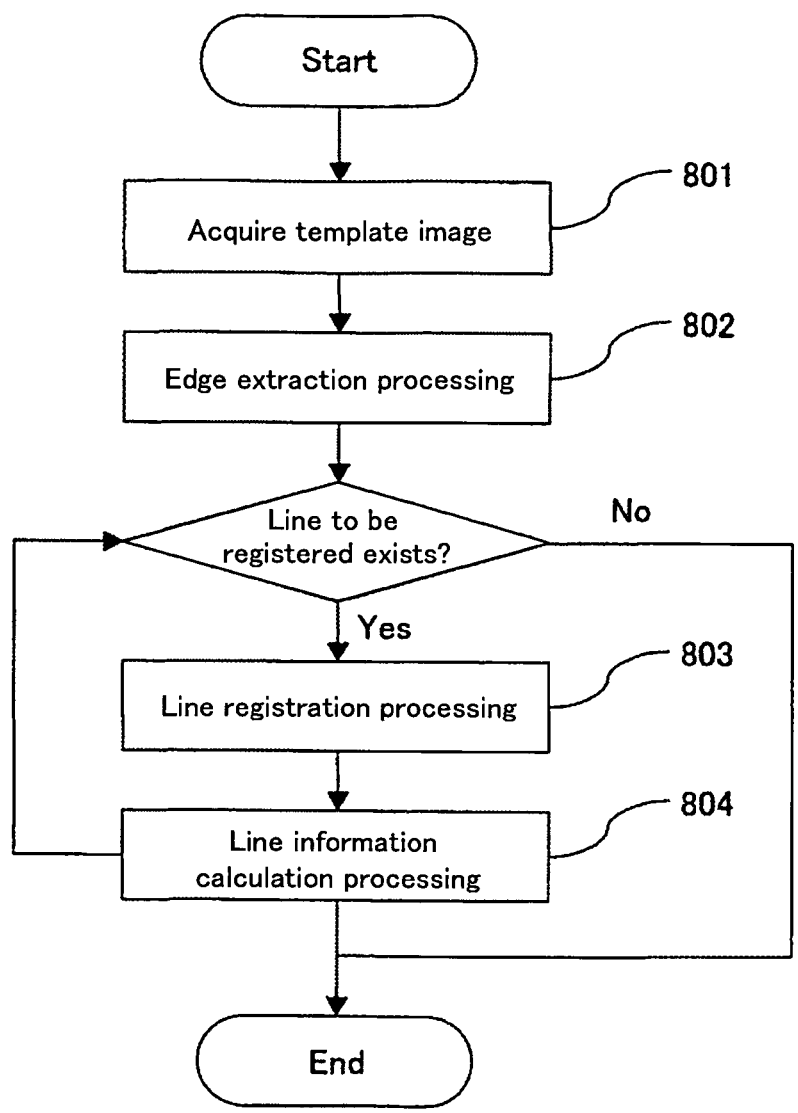
FIG. 8 is a figure showing an example of a process flow of template line registration processing.

FIG. 8 shows a process flow of template line registration processing.

In the normalized correlation technique, a template image has been used as it is. In the present embodiment, in addition to the template image, line information is also registered by making the user select a line on the basis of an edge extracted from the template image.

First, a template image is acquired (801), and thereafter the edge extraction processing as described above is performed (802).

Line registration processing (803) is processing in which the user is made to select an edge configuring a line from edges extracted by the edge extraction processing.

In order to enable the user to easily select the edge, a GUI has following features.

1. An edge extraction result is superposed on the image.

2. An R edge configuring the right side of the line and an L edge configuring the left side of the line are separately displayed at the time when the edge is selected (hereinafter referred to as R edge and L edge).

3. When the registered edge is checked, the R edge and the L edge which configure the same line are displayed in the same color.

Figure 9:
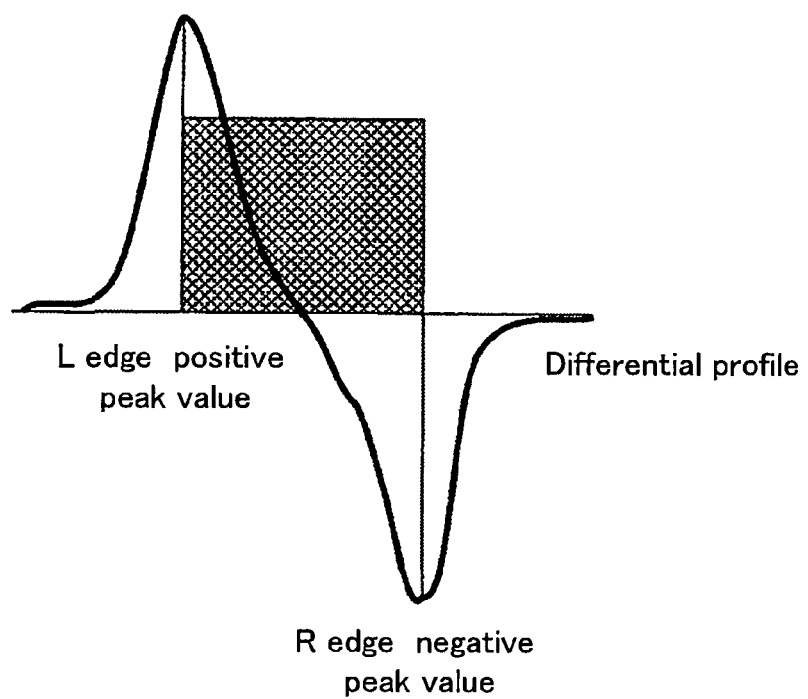
FIG. 9 is a figure for explaining an example of a technique for discriminating an L edge and an R edge.

The line has a luminance higher than the surrounding luminance. Thus, as shown in FIG. 9, the R edge configuring the right side of the line has a positive peak value, while the L edge configuring the left side of the line has a negative peak value. This makes it possible to discriminate between the R edge and the L edge in the stage of the edge extraction processing.

Figure 10:
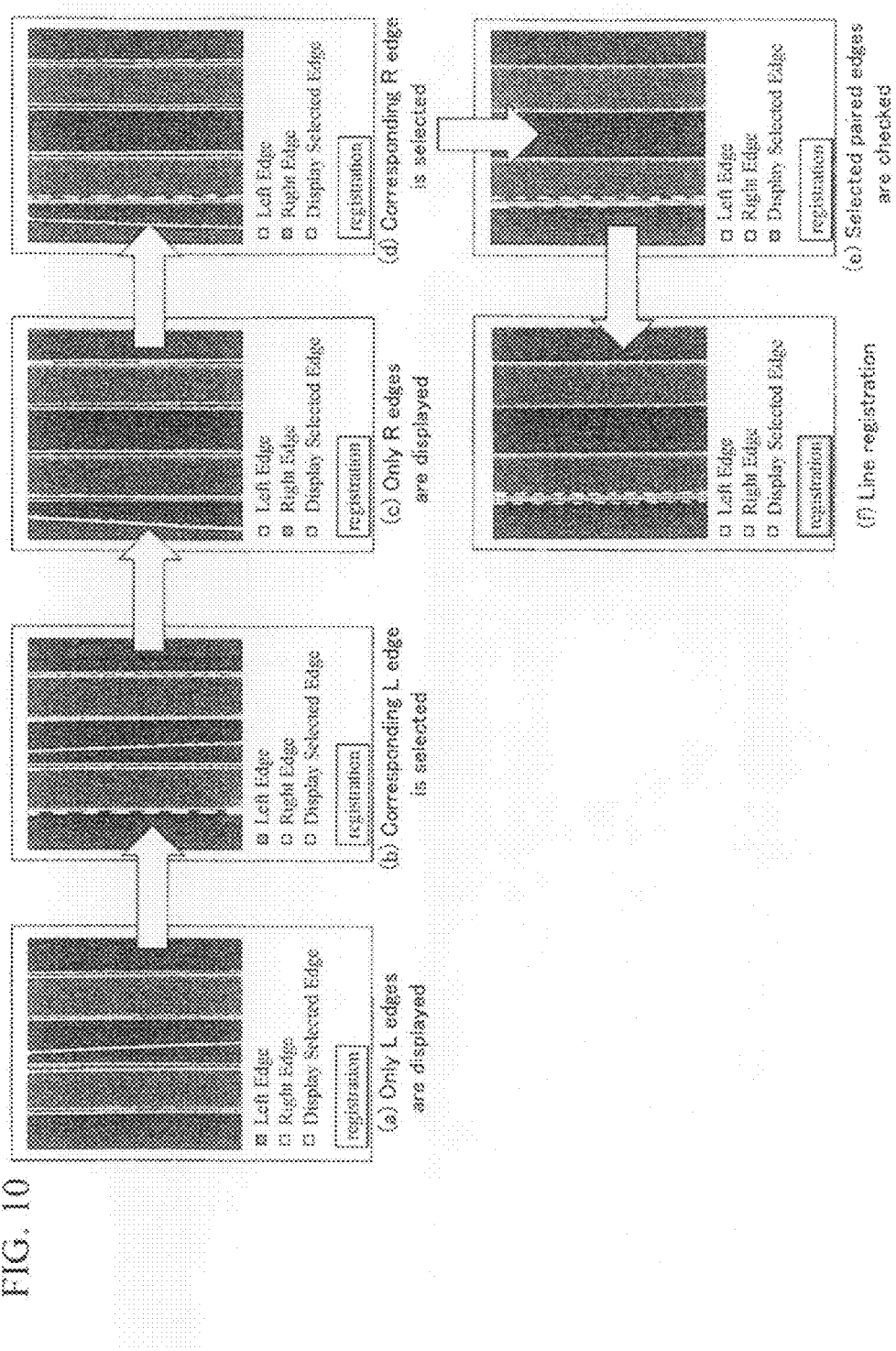
FIG. 10 is a figure for explaining an example of line registration.

FIG. 10 shows an example of line registration in which the above described GUI is used.

First, a Left Edge button is pressed (FIG. 10A) so that only L edges are displayed (by solid lines). Then, an L edge corresponding to a line to be registered is selected (the selected line is displayed by a dotted line as shown in FIG. 10B). Next, a Right Edge button is pressed (FIG. 10C) so that only R edges are displayed (by solid lines). Then, an R edge corresponding to the line to be registered is selected (the selected line is displayed by a dotted line as shown in FIG. 10D). When a Display Selected Edge button is pressed in the state where the R edge and the L edge are selected, the selected edges are displayed in the same color (by dotted lines).

Finally, a registration button is pressed so that the line is registered (FIG. 10F).

Figure 11:
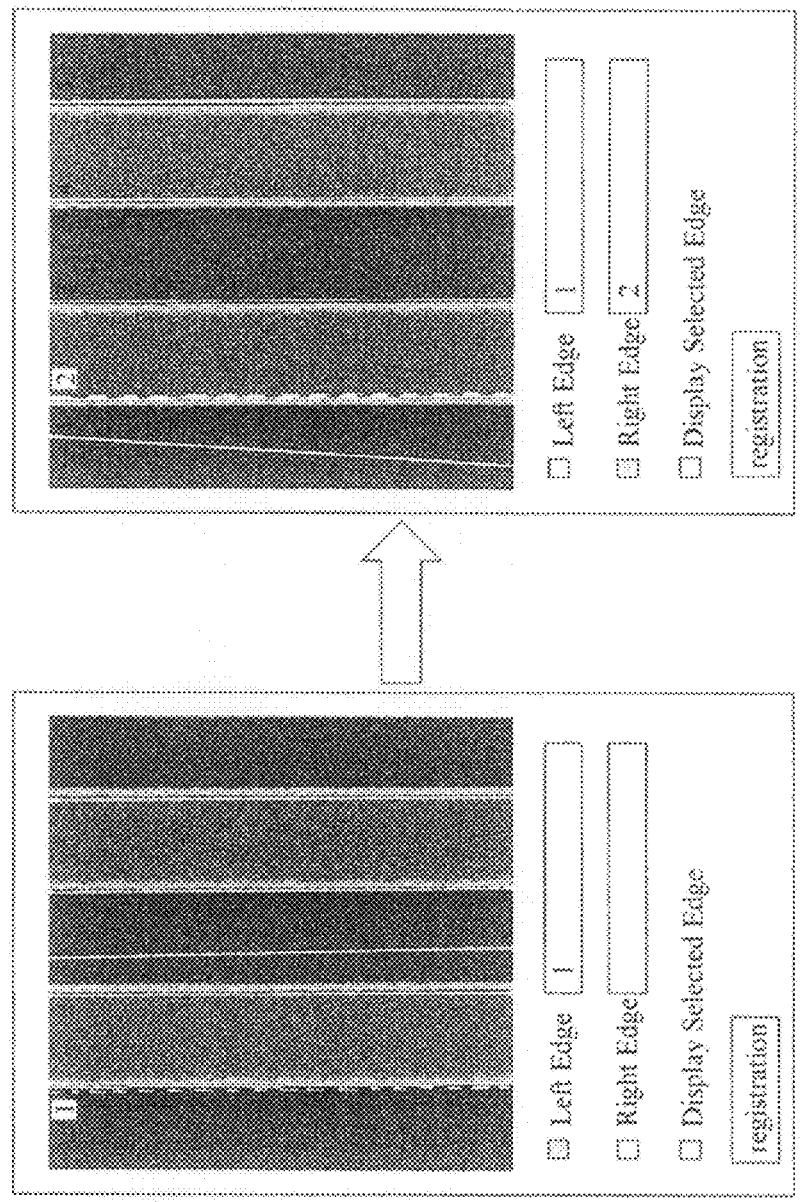
FIG. 11 is a figure for explaining an example of edge selection.

In the technique for selecting the edge as shown in FIG. 10B and FIG. 10D, it is assumed to use a technique in which the mouse is clicked at a point of the displayed edge. However, as shown in FIG. 11, numbers may also be assigned beforehand to the respective edges so as to make the user select the number.

In line information calculation processing (804), the following information necessary for effecting the matching is acquired for the line which is registered by the user in the processing 803.

Information necessary for specifying an edge configuring a line (1) the edge position and peak value of an L edge (2) the edge position and peak value of an R edge Information necessary for obtaining an evaluation value of a line for which the matching is effected (3) a line model The information for the items (1) and (2) is already obtained, and hence the explanation thereof is omitted here.

Figure 12:
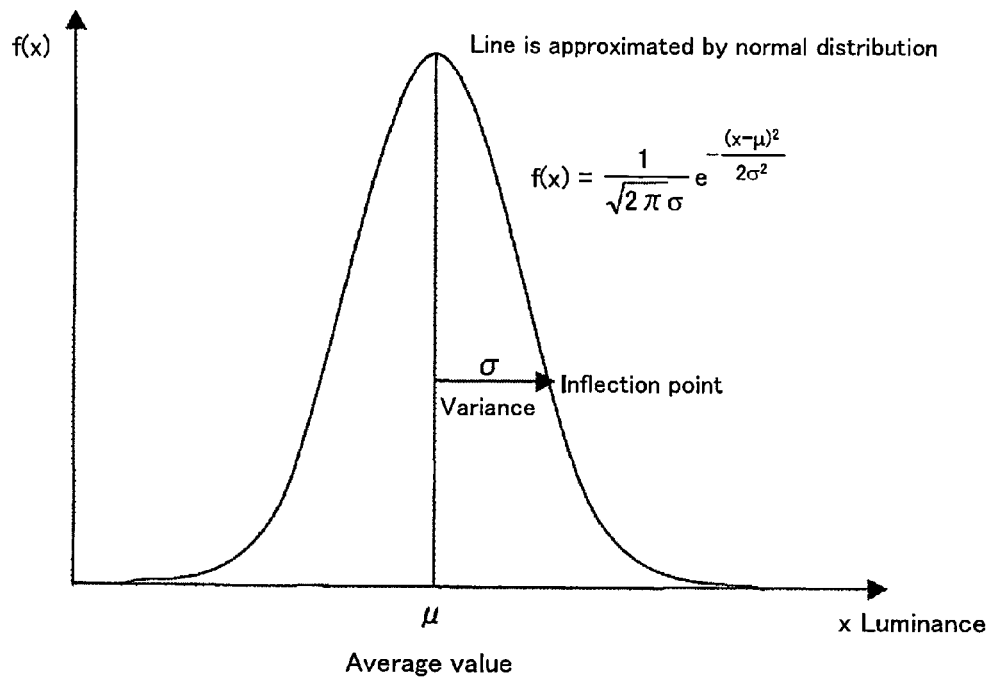
FIG. 12 is a figure for explaining an illustration of a line model.

In the line model (3), a line is regarded as a luminance set having a certain variation. Evaluation values of the lines can be easily obtained by modeling the lines. Here, the line is approximated by the normal distribution of luminance. When the average μ and variance σ of luminance of an area surrounded by the L edge and the R edge which are selected in the line registration processing are obtained, the line can be expressed by formula 8 (see FIG. 12).

$$f(x) = \frac{1}{\sqrt{2\pi}\,\sigma} e^{-\frac{(x-\mu)^2}{2\sigma^2}} \qquad \text{(Formula 8)}$$

The processing 803 and the processing 804, as described above, are repeated until all the lines are registered.

Figure 13:
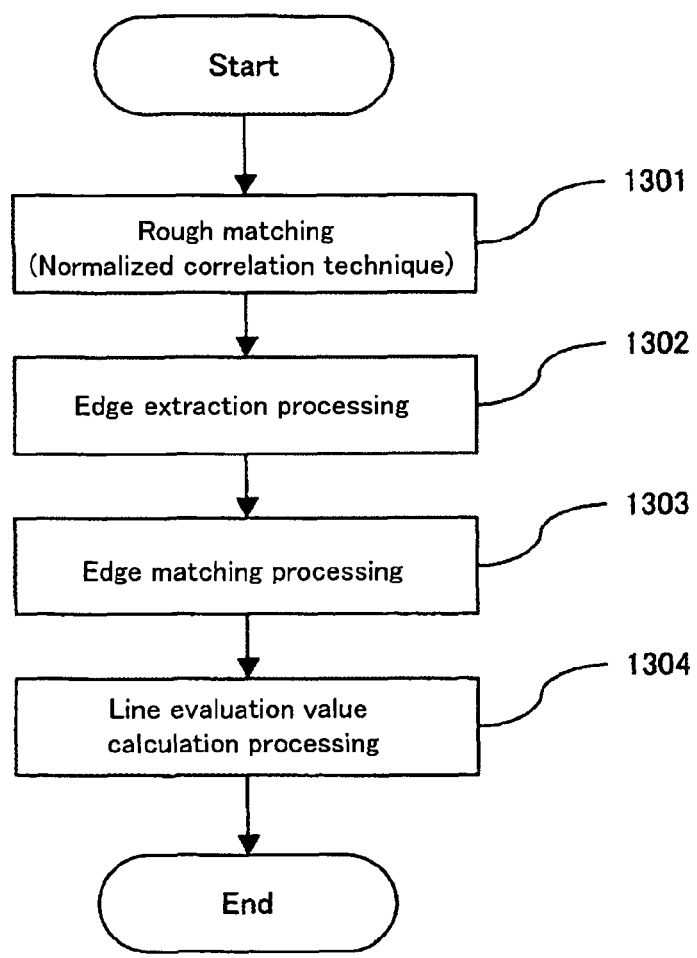
FIG. 13 is a figure for explaining an example of a process flow of line matching.

FIG. 13 shows a process flow of line matching.

Rough matching processing 1301 is matching processing based on the conventional normalized correlation technique. As described with reference to FIG. 7, the matching is effected between positions having highest correlation values, and hence, at this time, rough positioning is performed. After the rough matching is finished, the image coordinate system of the detected image is made to match with the image coordinate system of the template image. Then, the same region as the template image is again acquired.

Edge extraction processing 1302 is the same as the edge extraction processing as described in embodiment 1. An edge is extracted from the detected image. As described above, the L edge and the R edge can be discriminated from each other (see FIG. 9). Thus, the extracted edges are classified into the L edge and the R edge.

In the edge matching processing 1303, an edge corresponding to each of the L (R) edges registered in the template line registration processing is obtained from the edges extracted from the detected image. Specifically, an edge having the highest evaluation value is set as the corresponding edge by using formula 9. At this time, the evaluation is performed respectively between the L edges and between the R edges.

$$\text{Eval}_{Edge} = \alpha \times \text{Eval}_{Pos} + (1-\alpha) \times \text{Eval}_{Peak} \qquad \text{(Formula 9)}$$

α: weight (0≤α≤1)

$$\text{Eval}_{Pos} = 1 - \frac{|Pos_M - Pos_T|}{\lambda_{Pos}}$$

However, $\lambda_{Pos} < |Pos_M - Pos_T| \Rightarrow \text{Eval}_{Peak} = 0$ $Pos_M$: the edge position of an edge extracted from a detected image $Pos_T$: the edge position of an edge registered in template line registration processing $\lambda_{Pos}$: a likelihood of an edge position $$\text{Eval}_{Peak} = 1 - \frac{|Peak_M - Peak_T|}{\lambda_{Peak}}$$

However, $\lambda_{Peak} < |Peak_M - Peak_T| \Rightarrow \text{Eval}_{Peak} = 0$ $Peak_M$: an edge peak value of an edge extracted from a detected image $Peak_T$: an edge peak value of an edge registered in template line registration processing $\lambda_{Peak}$: a likelihood of a peak value In the edge matching processing 1303, attention is directed to the edge configuring the line, and the corresponding line is obtained on the basis of the matching degree of the edge. In line evaluation value calculation processing 1304, it is evaluated whether or not a line obtained by the edge matching processing is suitable as the line in terms of the position and the luminance distribution.

Figure 14:
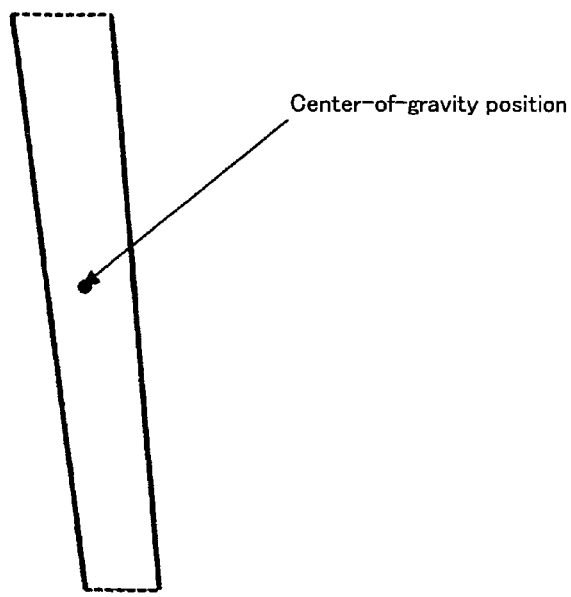
FIG. 14 is an illustration of a line position.
Figure 15:
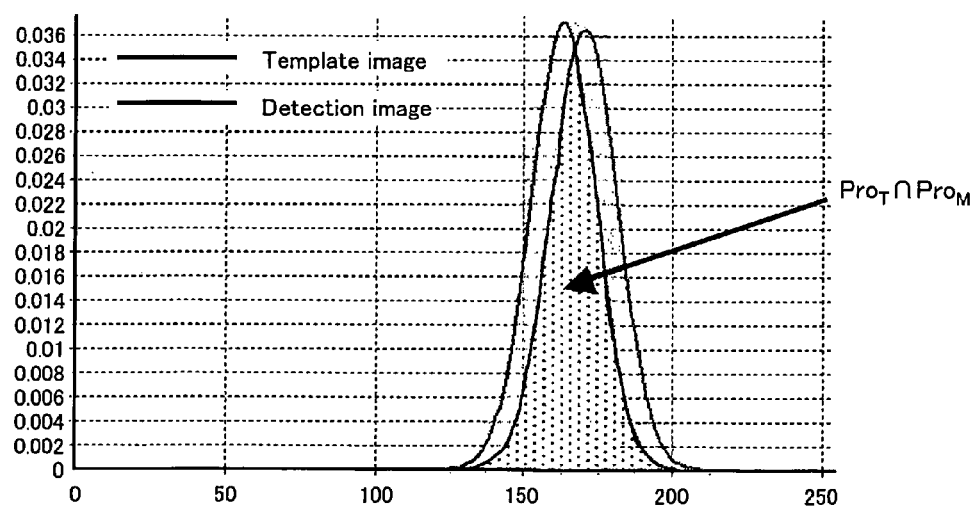
FIG. 15 is an illustration of the second term of the evaluation formula.

The line evaluation formula is represented by formula 10. The first term corresponds to the line position evaluation, and the second term corresponds to the line luminance distribution evaluation. As for the line position, the center-of-gravity position is set as the line position because the edge may be inclined (see FIG. 14). The second term is the line model as described above. The line model is also obtained for the corresponding line in the detected image, and the overlapping portion between the two distribution models is set as the evaluation value (see FIG. 15).

This processing is performed for the registered lines, and the average value of the obtained evaluation values is set as the matching evaluation value.

$$\text{Eval}_{Line} = \frac{\left\{\sum_{i=1}^{L} \alpha \times \text{Eval}_{Pos(i)} + (1-\alpha)\text{Eval}_{Pro(i)}\right\}}{L} \qquad \text{(Formula 10)}$$

α: weight (0≤α≤1)
L: the number of lines $$\text{Eval}_{Pos(i)} = 1 - \frac{|Pos_{M(i)} - Pos_{T(i)}|}{\lambda_{Pos}}$$

However, $\lambda_{Pos} < |Pos_{M(i)} - Pos_{T(i)}| \Rightarrow \text{Eval}_{Pos(i)} = 0$ $POS_{M(i)}$: the position of the i-th matched line (the center-of-gravity position of the L edge and the R edge which are matched with each other)

$Pos_{T(i)}$: the position of the i-th line registered in template line registration processing (the center-of-gravity position of the L edge and the R edge)

$\lambda_{Pos}$: a likelihood of an edge position $$\text{Eval}_{Peak(i)} = \text{Pro}_{M(i)} \cap \text{Pro}_{T(i)}$$

$\text{Pro}_{M(i)}$: a line model of a matched line $\text{Pro}_{T(i)}$: a line model of a line registered in template line registration processing With the above described processing, it is possible to effect the matching for line patterns whose position and width are varied. Further, it is possible to represent an intelligible evaluation value to the user.

According to the combined use of two techniques having different features, in an edge extraction technique for extracting an edge serving as a feature from an electron microscope image which has a low S/N ratio and which is obtained by scanning an electron beam on a sample, it is possible to robustly obtain the edge position in such a manner that there are obtained an original image differential profile which reacts sensitively to the edge and which also sensitively reacts to noise, and a filter image smoothing profile which is robust to noise and which has low sensitivity to noise, and that peak positions of the two profiles are compared with each other.

What is claimed is:

1. A computer-implemented method for extracting an edge of a pattern from an image obtained by a charged particle beam apparatus, the method comprising computer-implemented method steps of:
    (a) detecting a first edge candidate by specifying a peak position of a profile which is formed by performing projection processing of an image obtained by the charged particle beam apparatus;
    (b) detecting a particular pixel, as a second edge candidate, from the image from which the first edge candidate is detected, the particular pixel being detected such that a difference between a pixel value of a first pixel and a pixel value of a second pixel which is different from the first pixel is significant, the first pixel and the second pixel being in a predetermined positional relationship with respect to the particular pixel, respectively; and (c) extracting a pixel where the first edge candidate and the second edge candidate coincide with each other, as the edge of a pattern.

2. The method according to claim 1, wherein:

in the statistical filter processing step (b), a nonparametric test is performed in a filter area.

3. The method according to claim 2, wherein when the nonparametric test is performed, sampling is performed so that two pixels to be compared are positioned in line symmetry with each other.

4. The method according to claim 1, wherein:

the image subject to edge detection is divided beforehand into a plurality of areas, an edge position is determined in each of the areas, and an edge of a line pattern is determined by linear approximation of the determined edge positions.

5. Charged particle beam apparatus comprising:

a charged particle source;

a scanning deflector configured to scan a charged particle beam emitted from the charged particle source; and an edge detecting section configured to detect a position of an edge from an image obtained by the scan of the scanning deflector, wherein the edge detection section is configured to perform:

(a) detecting a first edge candidate by specifying a peak position of a profile which is formed by performing projection processing of the image obtained by the charged particle beam apparatus;

(b) detecting a particular pixel, as a second edge candidate, from the image from which the first edge candidate is detected, the particular pixel being detected such that a difference between a pixel value of a first pixel and a pixel value of a second pixel which is different from the first pixel is significant, the first pixel and the second pixel being in a redetermined positional relationship with respect to the particular pixel, respectively; and (c) extracting a pixel where the first edge candidate and the second edge candidate coincide with each other, as the edge of a pattern.

6. The charged particle equipment according to claim 5, wherein the edge detecting section is further configured so that:

in the statistical filter processing, a nonparametric test is performed in a filter area.

7. The charged particle equipment according to claim 6, wherein the edge detecting section is further configured so that, when the nonparametric test is performed, sampling is performed so that two pixels to be compared are positioned in line symmetry with each other.

8. The charged particle equipment according to claim 5, wherein the edge detecting section is further configured so that:

the image is divided beforehand into a plurality of areas, an edge position is determined in each of the areas, and an edge of a line pattern is determined by linear approximation of the determined edge positions.

* * * * *